(12) United States Patent
Amro et al.

(10) Patent No.: US 6,948,169 B1
(45) Date of Patent: Sep. 20, 2005

(54) WEB-BASED FACTORY MANUFACTURING OF COMPUTERS IN A BUILD-TO-ORDER MANUFACTURING ENVIRONMENT

(75) Inventors: Hatim Y. Amro, Austin, TX (US); Robert G. Nadon, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 485 days.

(21) Appl. No.: 09/714,323

(22) Filed: Nov. 16, 2000

(51) Int. Cl.$^7$ .............................................. G06F 9/44
(52) U.S. Cl. ........................................ 717/178; 705/26
(58) Field of Search ............................. 717/168–178; 705/26, 27

(56) References Cited

U.S. PATENT DOCUMENTS

| | | | |
|---|---|---|---|
| 4,992,940 A * | 2/1991 | Dworkin ........................ | 705/26 |
| 5,978,590 A * | 11/1999 | Imai et al. .................... | 717/177 |
| 5,995,757 A | 11/1999 | Amberg et al. | |
| 6,018,720 A * | 1/2000 | Fujimoto ...................... | 705/26 |
| 6,041,411 A * | 3/2000 | Wyatt .......................... | 713/200 |
| 6,151,643 A * | 11/2000 | Cheng et al. .................. | 710/36 |
| 6,230,319 B1 * | 5/2001 | Britt et al. ................... | 717/173 |
| 6,247,130 B1 * | 6/2001 | Fritsch ........................ | 713/171 |
| 6,266,809 B1 * | 7/2001 | Craig et al. ................... | 717/173 |
| 6,282,709 B1 * | 8/2001 | Reha et al. ................... | 717/175 |

OTHER PUBLICATIONS

"Mastering Windows 98" by Robert Cowart, Sybex, 1998.*

* cited by examiner

Primary Examiner—Todd Ingberg
Assistant Examiner—Eric B. Kiss
(74) Attorney, Agent, or Firm—Haynes and Boone, LLP

(57) ABSTRACT

One embodiment is a system and method for facilitating factory-installation of software in a build-to-order ("BTO") manufacturing environment using a web-based software distribution system. Subsequent to physical assembly, the minimum software required for a computer to boot up and operate and connect to the Internet is installed on the hard drive thereof. Upon initial boot-up of the computer, a "Web-Based Install" ("WBI") icon is displayed on the desktop interface element thereof. Clicking on this icon causes the computer to be connected to a secure website of the computer manufacturer ("Internet boot facility"). An ID number identifying the particular computer is then automatically provided to the Internet boot facility and a page including a list of all of the software which the customer purchased for the identified computer is displayed to the customer. The customer may select one or more programs to be downloaded to and installed on the computer by clicking on the associated link(s) or icon(s). Alternatively, rather than a WBI icon, icons for each of the purchased software packages are displayed on the desktop interface element thereof when the computer is first booted. Clicking on an icon causes the computer to connect to the Internet boot facility, and, after the computer is identified thereto, downloading and installation of the software identified by the icon is performed. Alternatively, the download and installation process is initiated immediately and automatically when the computer is first booted.

8 Claims, 2 Drawing Sheets

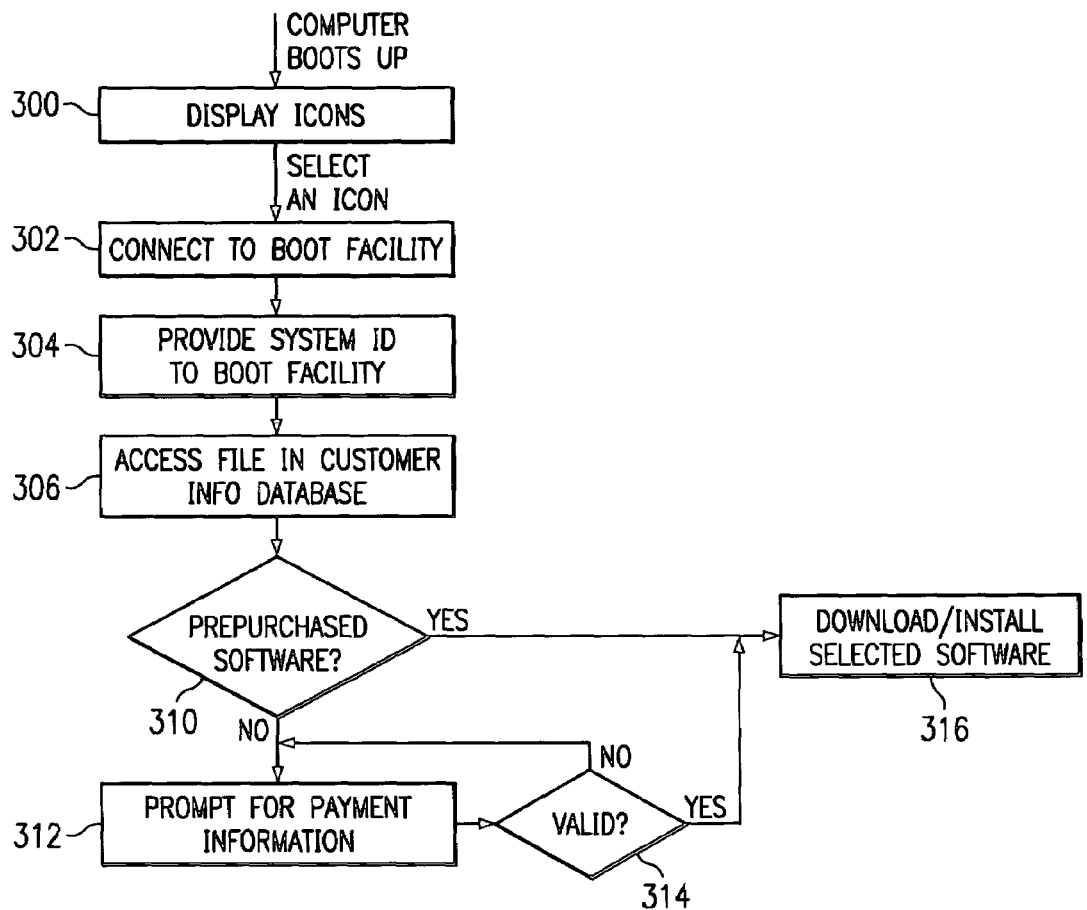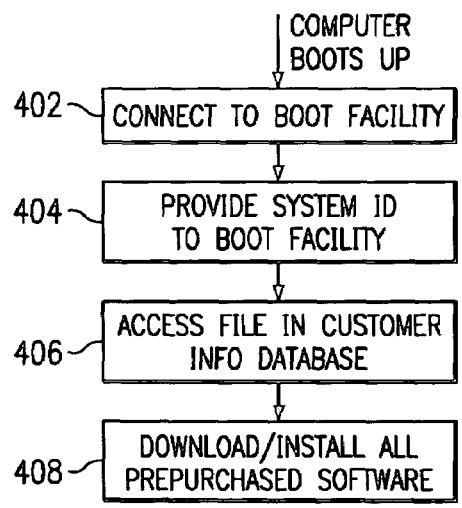

WEB-BASED FACTORY MANUFACTURING OF COMPUTERS IN A BUILD-TO-ORDER MANUFACTURING ENVIRONMENT

BACKGROUND

The disclosures herein relate generally to build-to-order ("BTO") computers and more particularly to a system and method for performing web-based installation of software on such computers.

In a BTO computer manufacturing environment, one of the most, if not the most, time-consuming stages is the downloading and installation of customer-selected software onto the hard drive of each of the computers. In particular, after each computer has been assembled according to the customer's requirements, the computer is placed in a burn-rack and connected to a network server via appropriate network connections. At this point, all software components ordered by the customer, including, for example, one or more operating systems ("OS"), appropriate drivers, and selected application programs, are downloaded from the server to the computer, where they are installed on the hard drive thereof. Once the software has been installed, the computer is tested to insure that it is operational.

As previously alluded to, the factory-installation process described above is an extremely cumbersome, slow, and therefore expensive process. One reason for this is that many applications are automatically loaded and installed with the customer-selected OS regardless of customer requirements. In addition, there is an ever-changing architecture that computer manufacturers must fit into the factory structure (e.g., 64-bit architecture). In a particular embodiment of a factory installation facility, during the installation process, an entire OS along with all applications is loaded into the box via a NetWare server employing a FIDA floppy.

Therefore, what is needed is a system and method that increases the speed and decreases the cost involved in manufacturing BTO computers, especially, with regard to the software installation process.

SUMMARY

One embodiment accordingly provides for increasing the speed of software installation. To this end, an icon is displayed on a display of a computer system. The icon is selected and, in response, a website comprising an Internet boot facility is accessed via an Internet connection. An ID number is provided to the Internet boot facility for identifying the computer system to the internet boot facility. At least one software product associated with the ID number is downloaded to and installed on the computer system.

A principal advantage of the embodiments described herein is that they reduce the amount of time required between taking an order for a computer and shipping that computer to the customer.

Another advantage of the embodiments described herein is that, due to the reduction in time, and therefore cost, required to manufacture and ship a computer in this manner, the computer manufacturer can offer customers willing to take advantage of the features described herein, a discount on the purchase price of their computers.

BRIEF DESCRIPTION OF THE DRAWING FIGURES

FIG. 3 illustrates an alternative embodiment.

FIG. 4 illustrates yet another alternative embodiment.

DETAILED DESCRIPTION

Figure 1:
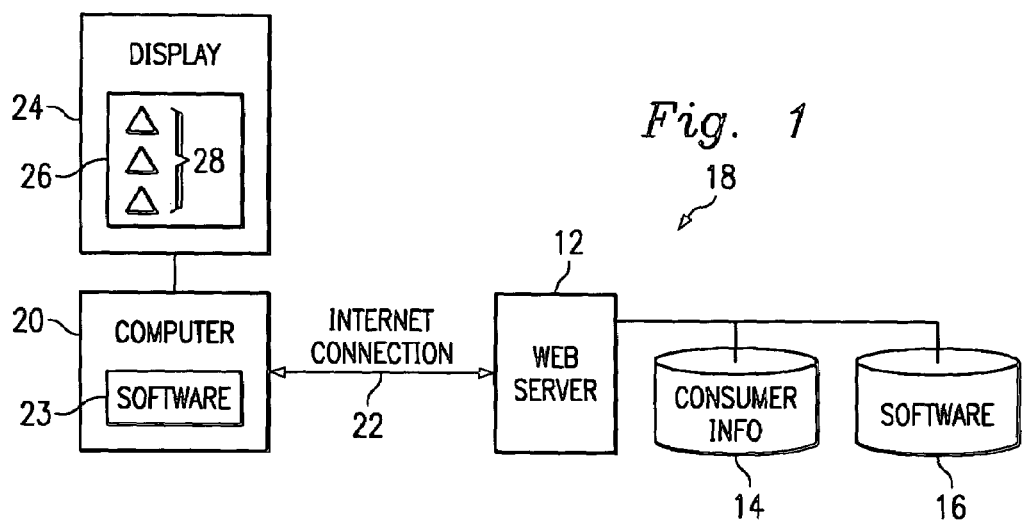
FIG. 1 is a block diagram of an environment for implementing the embodiments described herein.

FIG. 1 is an illustration of an environment 10 for implementing the embodiments described herein. The environment 10 includes a web server 12 connected to one or more databases, represented in FIG. 1 as a customer information database 14 and a software database 16. The server 12 and databases 14, 16, collectively constitute an Internet boot facility 18. As described in greater detail below, BTO computers, represented in FIG. 1 by a computer 20, are capable of connecting to the boot facility 18 via a conventional Internet connection 22 to download and install software packages therefrom. Each BTO computer, including the computer 20, has assigned thereto a unique system ID number.

In particular, the customer information database 14 includes a file for each computer manufactured by the manufacturer, including the computer 20, indexed by the computer's system ID number. The file itself includes a list of all of the software that the customer has purchased in connection with the identified computer. The software database 16 includes downloadable copies of all of the software available for installation on computers manufactured by the manufacturer.

Installed on a hard drive (not shown) of the computer 20 is the minimum software 23 required to render the computer 20 operational and capable of connection to the Internet. The computer 20 also includes a display 24 for displaying a desktop element 26 including one or more icons 28, as well as web pages (not shown) generated by the server 12.

Figure 2:
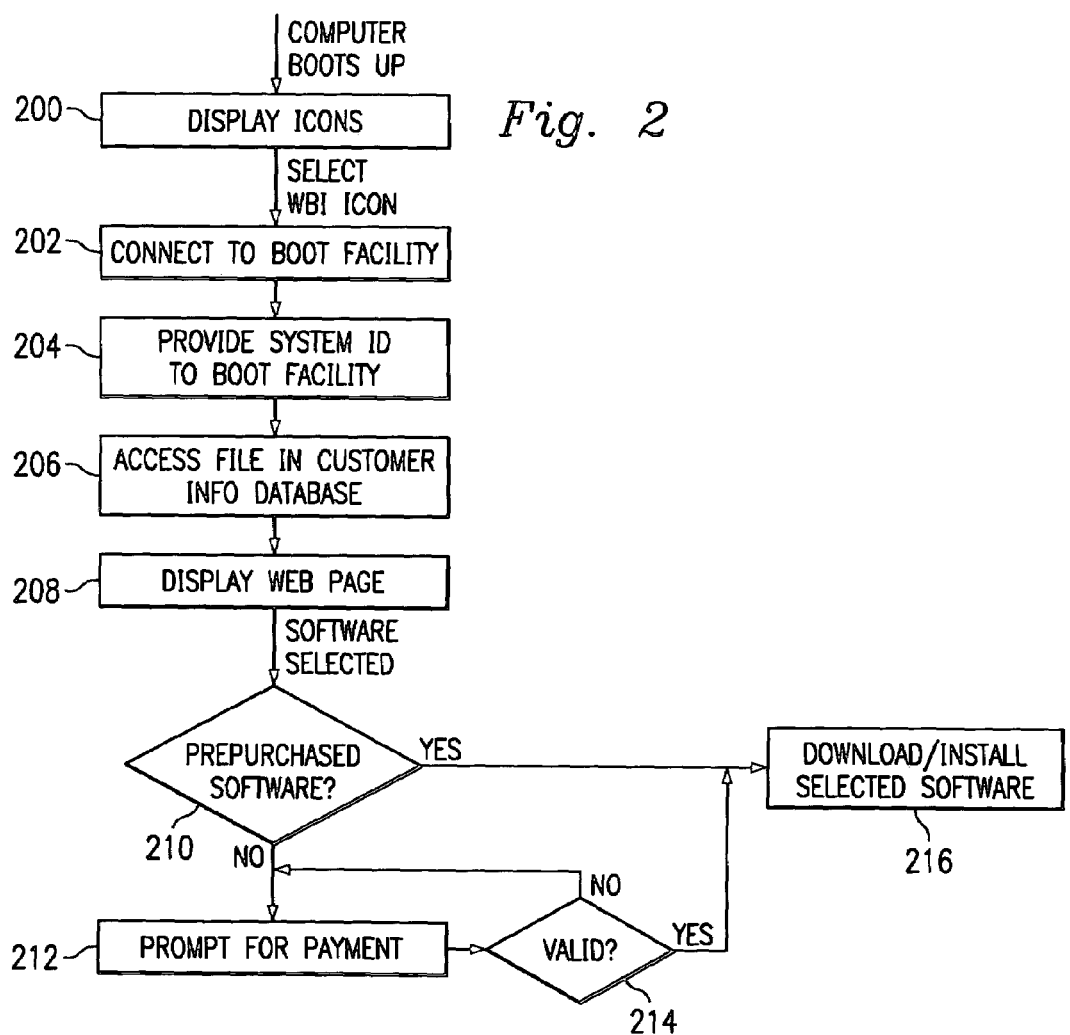
FIG. 2 illustrates a first embodiment.

FIG. 2 is a flowchart of the operation of one embodiment. In step 200, after the computer 20 has booted, the desktop element 26, including icons 28, is displayed thereon. In this embodiment, one of the icons 28 is a web-based install ("WBI") icon which, when clicked on, causes the computer 20 to be connected to the boot facility 18. In step 202, responsive to the customer clicking on the WBI icon, the computer 20 is connected to the boot facility 18 via the Internet connection 22. In step 204, the system ID number for the computer 20 is automatically provided to the boot facility 18. In step 206, the system ID number is used to access the corresponding file in the customer information database 14. In step 208, a web page including a list of the software specified in the file accessed in step 206 is displayed on the display 24. Additionally, software not previously purchased by the customer, and therefore not specified in the accessed file, may be included on the web page.

In step 210, responsive to the customer clicking on one of the software items in the list, a determination is made whether the customer has paid for the selected software. If not, execution proceeds to step 212, in which the customer is prompted to enter payment information. In step 214, a determination is made whether the customer has entered valid payment information in step 212. If not, execution returns to step 212 and the customer is again prompted; otherwise, execution proceeds to step 216. Similarly, if in step 210, it is determined that the customer has paid for the selected software, execution proceeds directly to step 216. In step 216, the selected software is downloaded from the software database 16 to the hard drive of the computer 20 and installed thereon.

FIG. 3 is a flowchart of the operation of an alternative embodiment. In step 300, after the computer 20 has booted, the desktop element 26, including icons 28, is displayed thereon. In this embodiment, each of the icons 28 is associated with a software package available to be downloaded to the hard drive of the computer 20. In step 302, responsive to the customer clicking on one of the icons 28, the computer 20 is connected to the boot facility 18 via the Internet connection 22. In step 304, the system ID number for the computer 20 is automatically provided to the boot facility 18. In step 306, the system ID number is used to access the corresponding file in the customer information database 14.

In step 310, a determination is made whether the customer has paid for the selected software. If not, execution proceeds to step 312, in which the customer is prompted to enter payment information. In step 314, a determination is made whether the customer has entered valid payment information in step 312. If not, execution returns to step 312 and the customer is again prompted; otherwise, execution proceeds to step 316. Similarly, if in step 310, it is determined that the customer has paid for the selected software, execution proceeds directly to step 316. In step 316, the selected software is downloaded from the software database 16 to the hard drive of the computer 20 and installed thereon.

In view of the foregoing, one embodiment, accordingly, provides a system and method for facilitating factory-installation of software in a build-to-order ("BTO") manufacturing environment using a web-based software distribution system. In particular, subsequent to physical assembly, the minimum software required for a computer to boot up, minimally function and connect to the Internet, rather than all of the software purchased by the customer, is installed by the computer manufacturer on the hard drive thereof before the computer is shipped to the customer.

In one embodiment, when the customer first boots the computer, a "Web-Based Install" ("WBI") icon is displayed on the desktop interface element thereof. Clicking on this icon causes the computer to connect, via an Internet connection, to a secure website of the computer manufacturer, hereinafter referred to as an "Internet boot facility". A system ID number uniquely identifying the particular computer to the Internet boot facility, and therefore to the computer manufacturer, is automatically provided to the Internet boot facility and a web page including a list of all of the software which the customer has purchased for the identified computer is displayed to the customer. At that point, the customer may select one or more programs to be downloaded to and installed on the computer by selecting, e.g., by clicking on, the associated link(s) or icon(s). Preferably, an "Install All" link or icon will also be included on the web page to enable the customer to download and install all of the software purchased for the computer with a single click.

In an alternative embodiment, rather than a WBI icon, icons for each of the software packages purchased by the customer for the particular computer are displayed on the desktop interface element thereof when the computer is first booted. In this embodiment, clicking on an icon causes the computer to be connected to the Internet boot facility, and, after the computer is identified to the Internet boot facility by the system ID number, downloading and installation of the software identified by the icon are performed. As described above, an "Install All" icon will preferably be included on the desktop element to enable the customer to initiate the downloading and installation of all of the purchased software with a single selection or click.

In yet another alternative embodiment, as soon as the customer boots the computer for the first time, the computer connects to the Internet boot facility and, after the computer is identified to the Internet boot facility by the system ID number, the process of downloading and installing the purchased software is conducted automatically, without user intervention. Alternatively, similar to the first embodiment described above, the customer may selectively download and install software applications via a web page list.

Another aspect of the above-described embodiments includes the ability to enable customers to download and install software not previously purchased by the customer by clicking on an associated icon or link provided on the Internet boot facility web page or desktop element. In these situations, the customer will be required to provide some form of payment, such as a credit or debit card number, to pay for the software. Alternatively, "bonus" software may be provided in the above-described manner at no cost to the customer as a marketing tactic, for example.

FIG. 4 is a flowchart of the operation of yet another alternative embodiment. In step 402, responsive to the computer 20 being booted for the first time, the computer 20 is immediately connected to the boot facility 18 via the Internet connection 22. In step 404, the system ID number for the computer 20 is automatically provided to the boot facility 18. In step 406, the system ID number is used to access the corresponding file in the customer information database 14. In step 408, all of the prepurchased software specified is downloaded from the software database 16 to the hard drive of the computer 20 and installed thereon.

Although illustrative embodiments have been shown and described, a wide range of modification change and substitution is contemplated in the foregoing disclosure and in some instances, some features of the embodiments may be employed without a corresponding use of other features. For example, it is conceivable that some software, although not purchased by the customer in connection with a particular computer, may be made available at no cost to the customer as a bonus, e.g., to encourage the customer to purchase other software from the same developer. Moreover, instead of requiring that the customer individually select each software package to be downloaded and installed, one of the icons or links on the desktop element 26 or web page could be designated as an "Install All" icon or link. Clicking on this icon or link would initiate the downloading and installation of all of the software purchased for a particular system as indicated in the corresponding file in the customer information database 14. Accordingly, it is appropriate that the appended claims be construed broadly and in a manner consistent with the scope of the embodiments disclosed herein.

What is claimed is:

1. A method of enabling a user to complete installation of selected software programs on a computer system, having a system ID, via the Internet, the method comprising:

installing, during manufacture, at least one pre-purchased software item;

providing the computer system to the user;

the user initially booting the system;

in response to the booting, displaying on a display of the computer system a plurality of icons, one of the icons being a web-based install (WBI) icon for connecting the computer system to an Internet boot facility;

the user selecting the WBI causing the computer system to be connected to the Internet boot facility, the system ID being automatically provided to the Internet boot facility;

using the system ID to access a corresponding file displayed on a web page and including a list of the pre-purchased software items, the web page including other software items not pre-purchased;

responsive to the user selecting any of the software items, determining whether the user has pre-purchased the selected software item, and if pre-purchased, automatically downloading the selected software items;

if the selected software item is not pre-purchased, prompting the user to enter payment information;

determining whether the payment information is valid; and if valid, downloading and installing the not pre-purchased software item on the computer system.

2. The method of claim 1 wherein each icon is associated with a pre-purchased software item.

3. The method of claim 2 wherein icons are also associated with the other software items.

4. The method of claim 1 wherein the Internet boot facility is maintained by a manufacturer of the computer system.

5. A system for enabling a user to complete installation of selected software programs on a computer system, having a system ID, via the Internet, the system comprising:

a minimum software package of pre-purchased software items installed on the computer system by a manufacturer;

the computer system being received and initially booted by the user;

in response to the booting, means for displaying on a display of the computer system a plurality of icons, one of the icons being a web-based install (WBI) icon for connecting the computer system to an Internet boot facility;

means for the user to select the WBI causing the computer system to be connected to the Internet boot facility, the system ID being automatically provided to the Internet boot facility;

means for using the system ID to access a corresponding file displayed on a web page and including a list of the pre-purchased software items, the web page including other software items not pre-purchased;

means, responsive to the user selecting any of the software items, for determining whether the user has pre-purchased the selected software items, and if pre-purchased, automatically downloading the selected software items;

means for determining if the selected software item is another software item not pre-purchased;

means for the user to enter payment information;

means for determining whether the payment information is valid; and if valid, means for downloading and installing the not pre-purchased software item on the computer system.

6. The system of claim 5 wherein each icon is associated with a pre-purchased software item.

7. The system of claim 6 wherein icons are also associated with the other software items.

8. The system of claim 5 wherein the Internet boot facility is maintained by the manufacturer of the computer system.

* * * * *